United States Patent [19]
Ohba

[11] Patent Number: 5,943,057
[45] Date of Patent: Aug. 24, 1999

[54] METHOD AND APPARATUS FOR PROCESSING THREE-DIMENSIONAL PICTURE INFORMATION

[75] Inventor: Akio Ohba, Kanagawa, Japan

[73] Assignee: Sony Corporation, Tokyo, Japan

[21] Appl. No.: 08/684,025

[22] Filed: Jul. 19, 1996

[30] Foreign Application Priority Data

Jul. 20, 1995 [JP] Japan ................................. 7-184108

[51] Int. Cl.⁶ ...................................................... G06T 17/30
[52] U.S. Cl. ........................................................... 345/419
[58] Field of Search ................................... 345/419, 436, 345/431, 126

[56] References Cited

U.S. PATENT DOCUMENTS

| | | | |
|---|---|---|---|
| 4,847,604 | 7/1989 | Doyle | 340/706 |
| 5,260,009 | 11/1993 | Penn | 264/40.1 |
| 5,333,244 | 7/1994 | Harashima | 395/119 |
| 5,561,746 | 10/1996 | Murata et al. | 395/119 |
| 5,657,437 | 8/1997 | Bishop et al. | 395/764 |
| 5,712,964 | 1/1998 | Kamada et al. | 395/118 |

*Primary Examiner*—Mark R. Powell
*Assistant Examiner*—Alford W. Kindred
*Attorney, Agent, or Firm*—Fulwider Patton Lee & Utecht, LLP

[57] ABSTRACT

A video information processor system employing a calculation unit for rapidly processing video information data at low cost and high efficiency. The commands and the video information data are entered to a bus interfacing unit of a video information processor over a main bus, and the commands are then construed by a command interpretation unit which supplies a controller, controlling calculation operations by a matrix calculation unit based on those commands. The video information data is stored over an internal bus by a plurality of registers with three data values as one set and subsequently read from the registers under control of the controller so as to be processed by a plurality of calculation units.

19 Claims, 5 Drawing Sheets

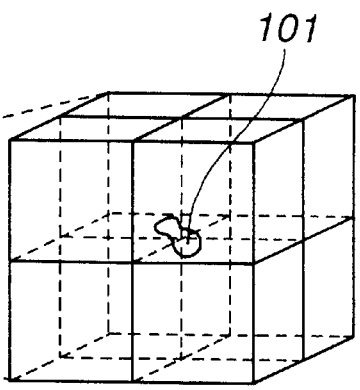
FIG.3A
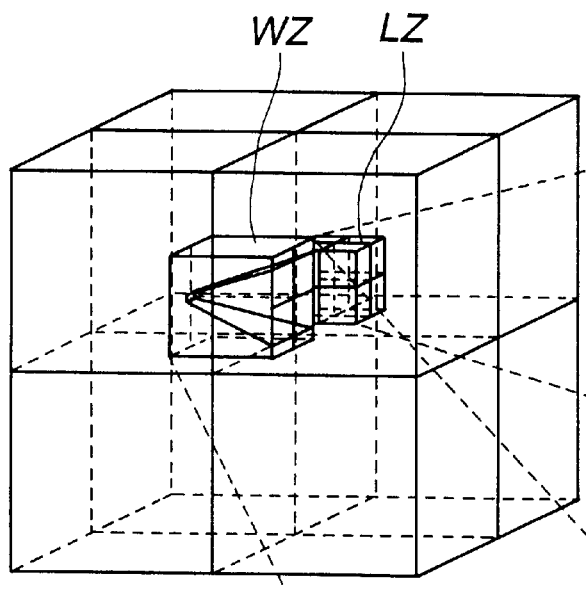
FIG.3B
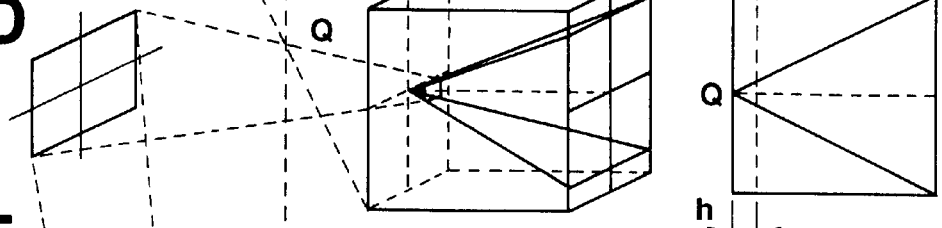
FIG.3C  FIG.3Ca  FIG.3Cb
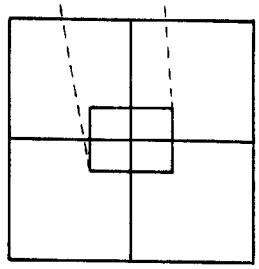
FIG.3D
FIG.3E

METHOD AND APPARATUS FOR PROCESSING THREE-DIMENSIONAL PICTURE INFORMATION

This application claims priority under the International Convention based upon Japanese Patent Application No. P07-184108, filed Jul. 20, 1995.

BACKGROUND OF THE INVENTION

1. Field of the Invention

This invention relates generally to improvements in a video information processing system for processing the video information of a three-dimensional picture and, more particularly, to a new and improved method and apparatus for processing image data rapidly, efficiently, and at relatively low cost.

2. Description of the Related Art

It has become common practice in the prior art to produce three-dimensional pictures. As such pictures are produced by a game machine, personal computer or a graphics computer, the number of three-dimensional pictures is increasing. To display such a three-dimensional picture, either a three-dimensional picture or a pseudo-three-dimensional picture which is the same as the displayed picture is first generated and then displayed.

For generating the pseudo-three-dimensional picture, a number of pictures, viewing an object to be displayed from plural directions are provided. Depending on changes in the viewing point, one of these pictures is selected and displayed, or plural two-dimensional pictures are superimposed along the direction of depth of the three-dimensional picture.

For displaying a three-dimensional picture, it is necessary to use a large volume of picture information and to carry out a correspondingly large quantity of calculations expeditiously. To carry out such picture processing, a dedicated processing unit, e.g., a digital signal processor (DSP) or a co-processor is typically used. These processors, which are provided with plural operating un its or a pipeline structure configured for carrying out signal processing as plural commands are overlapped with one another for performing parallel processing of the video information to enable high-speed processing operations.

In the design of such processing units, the pipeline structure needs to be flexible. This raises the costs of the processing units, such that it becomes difficult to design the processing units for performing large-scale parallel processing.

Accordingly, there has been a long existing need for enhanced image data processing which is more e conomical, rapid, and efficient. The present invention clearly fulfills these needs.

SUMMARY OF THE INVENTION

Briefly, and in general terms, the present invention provides an improved method and apparatus for processing three-dimensional picture information which at increased speed and efficiency as well as lower cost.

Accordingly, it is an object of the present invention to provide a new and improved method and apparatus for picture processing whereby the video information can be processed rapidly and efficiently at a reduced cost.

More particularly, by way of example and not necessarily by way of limitation, the present invention provides a video processing apparatus wherein plural picture information data derived from plural light sources illuminating an object made up of plural points, with three information data arranged as one set, and three-dimensional coordinates of respective points making up the object, with the three-dimensional coordinates and the information data being stored in storage means, are used for calculating two-dimensional coordinate values of the respective points of the object and the display information by calculation means under control of control means for generating the two-dimensional picture information to display the image of a three-dimensional object on a two-dimensional screen.

Video information processing methods, according to the present invention, provide plural picture information data derived from plural light sources illuminating an object made up of plural points, with three information data arranged as one set, and three-dimensional coordinates of respective points making up the object, are used for calculating two-dimensional coordinate values of the respective points of the object and the display information, for generating the two-dimensional picture information to display an image of a three-dimensional object on a two-dimensional screen.

With the video information processing method and apparatus of the present invention, three-dimensional coordinate values of the respective points making up the object and video information data derived from three light sources illuminating the object are used for calculating the two-dimensional coordinate values and the color information of respective points of the object, in which the video information data are arranged so that three data values make up a set. A pipeline structure employing three parallel calculation units is used for executing the commands three times. The video information data arranged with three information data values as one set is processed for calculations using a micro-program or a so-called sequencer, so that high-speed pipeline processing or parallel calculations may be performed efficiently. In addition, the hardware structure may be reduced in size, thus reducing hardware costs.

Hence, the present invention satisfies a long-existing need for enhanced image data processing which is economical, rapid, and efficient.

These and other objects and advantages of the invention will become apparent from the following more detailed description, when taken in conjunction with the accompanying drawings of illustrative embodiments.

DESCRIPTION OF THE DRAWINGS

FIGS. 3A–3E illustrate the process of coordinate transformation;

DETAILED DESCRIPTION OF THE PREFERRED EMBODIMENTS

Figure 1:
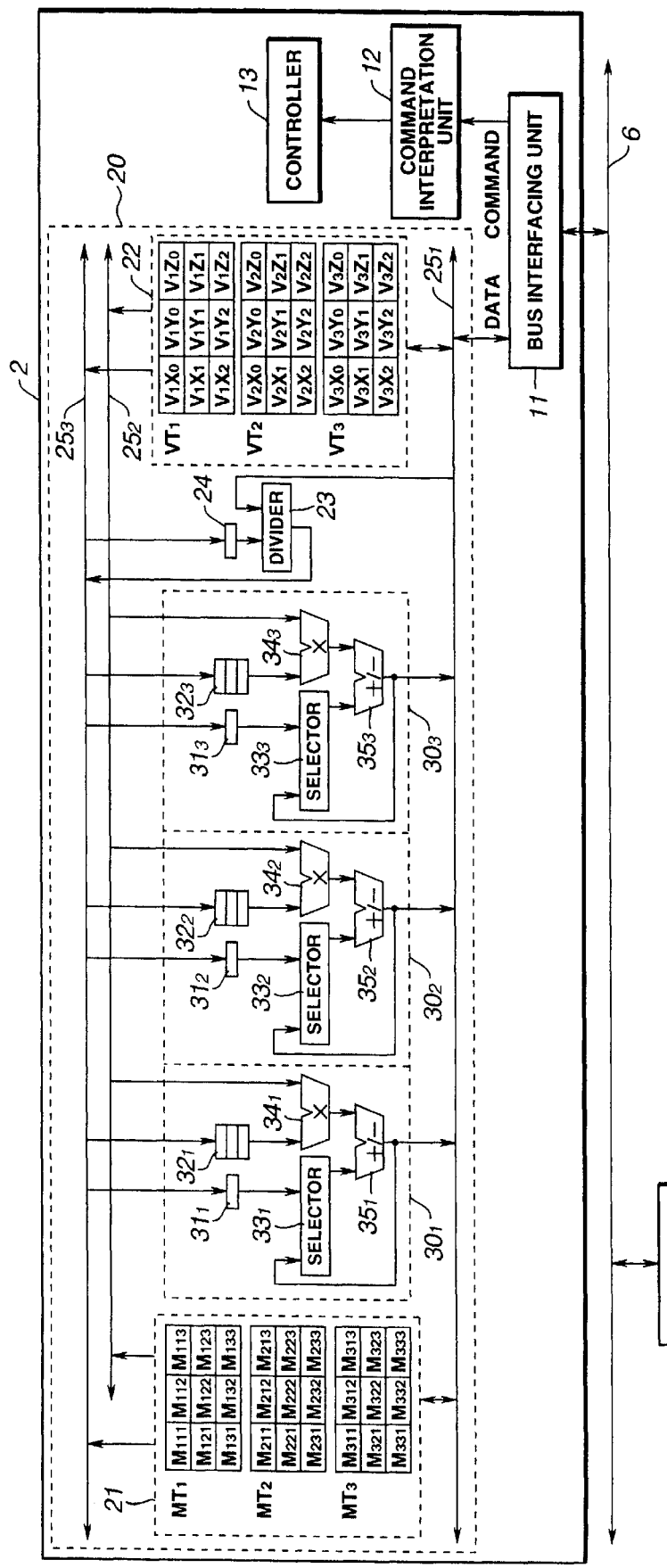
FIG. 1 is a combined block diagram and schematic view showing the structure of a video information processing system, in accordance with the present invention.

Referring now to the drawings, wherein like reference numerals denote like or corresponding parts throughout the drawing figures.

As best observed in FIG. 1 of the drawings, a video information processing apparatus 2, in accordance with the invention, includes registers 21, 22, as storage means for storing three-dimensional coordinates of respective points making up an object and plural light sources illuminating the object as plural three-data value sets, and a matrix processor 20, as processing means for calculating the two-dimensional coordinate values of the respective points of the object and the displayed information, using the plural three-data value sets of the video information stored in the registers 21, 22. The video information processing apparatus also includes a controller 13, as control means for causing the stored three-data value sets of the video information to be read out from the registers 21, 22 for carrying out the processing by the matrix processor 20.

Figure 2:
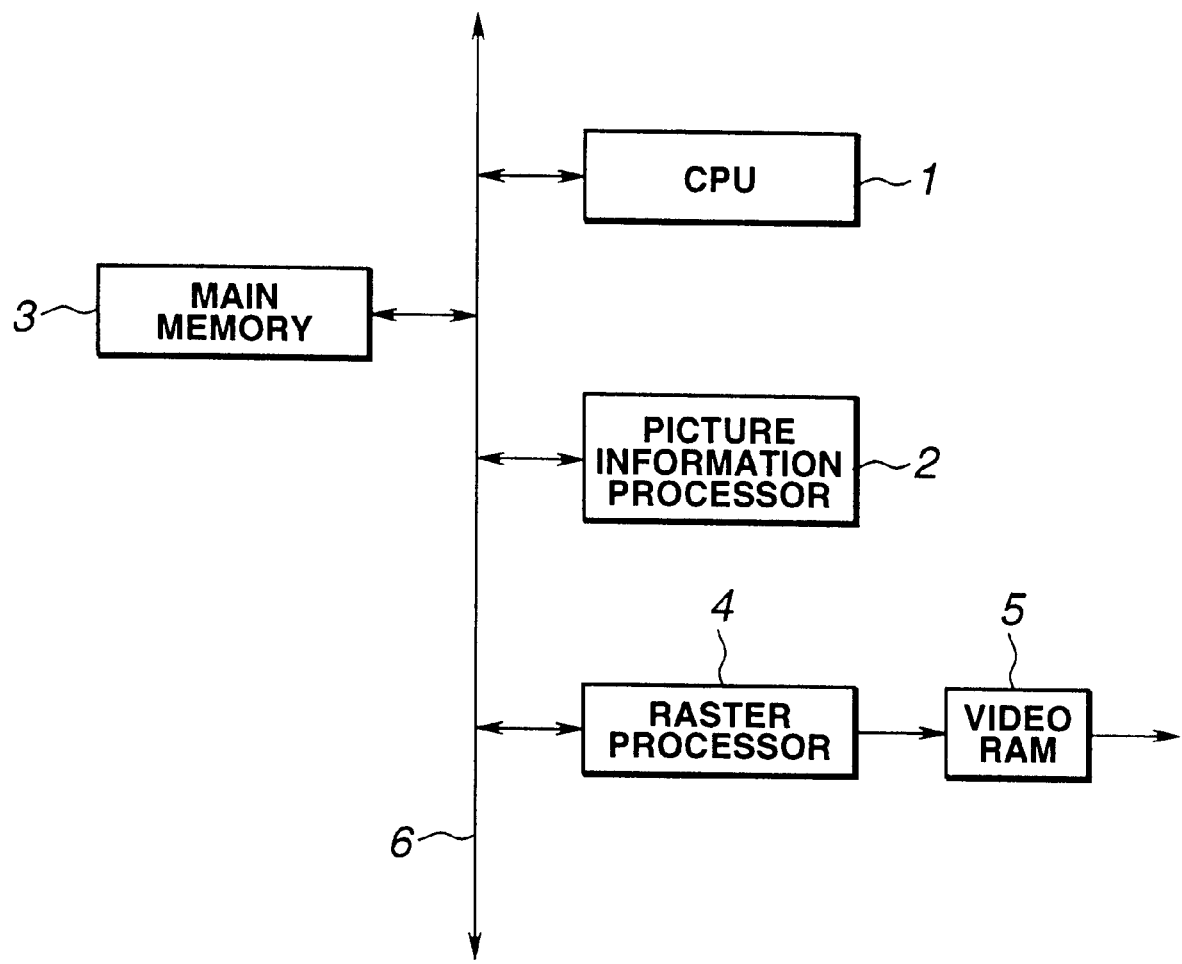
FIG. 2 is a block diagram showing a picture generating system.
Figure 4:
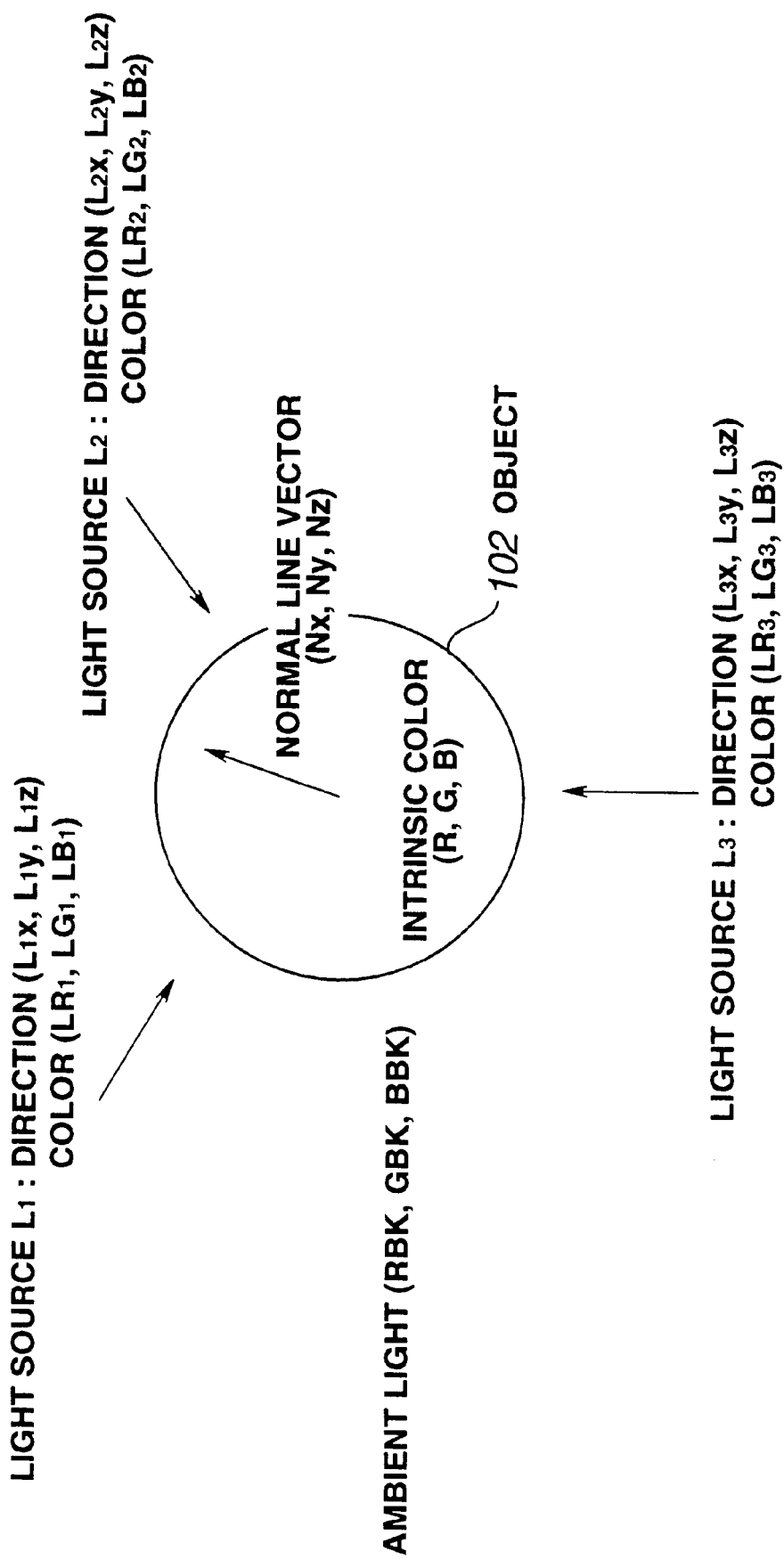
FIG. 4 illustrates the overall environment involving illumination of an object by light sources.

The picture information processor is connected to a main bus 6 as an external bus. To this main bus 6 are also connected a central processing unit (CPU) 1, a main memory 3 and a raster processor 4, all as shown in FIG. 2, for making up a picture generating apparatus. In this picture generating apparatus, the picture information processor 2 is constructed as a co-processor of the CPU 1.

In accordance with the present picture generating apparatus, a command is sent to the CPU 1 and to the picture information processor 2 based on the operating program or on an operation entered from outside the system. The CPU 1 and the picture information processor 2 interpret the command sent thereto to perform processing based on the interpreted command. This command causes the picture information processor 2 to perform processing of the picture information. The picture information, such as the three-dimensional coordinates of plural points constituting the object or the display information, stored in the main memory 3, is sent by the CPU 1 to the picture information processor 2 over the main bus 6. The picture information, such as the three-dimensional coordinates of plural points making up the object or the display information, will be subsequently described herein in greater detail.

The command sent to the picture information processor 2 is sent via a bus interfacing unit 11, shown in FIG. 1, to a command interpretation unit 12. The command interpretation unit 12 discriminates which processing operation is specified by the command from the bus interfacing unit 12. The command is then sent to a controller 13. The command interpretation unit 12 is also fed with the picture information, such as the display information or the three-dimensional coordinates read out from the main memory 3 over the main bus 6 under control of the CPU 1. The picture information, such as the display information or the three-dimensional coordinates, is sent from the bus interfacing unit 11 to the matrix processor 20.

This matrix processor 20 is controlled by the controller 13. The picture information sent to the matrix processor 20, such as the display information or the three-dimensional coordinates, is stored in the registers 21, 22 under control of the controller 13. The picture information, such as the display information of the three-dimensional coordinates, stored in the registers 21, 22, is read out under control of the controller 13. The picture information, such as the display information of the three-dimensional coordinates, is sent via internal buses 252, 253 parallel to an internal bus 251 to processing units 301, 302 and 303 where respective processing operations are performed. In this manner, the two-dimensional coordinate values for plural points constituting the object and the display information, for displaying a three-dimensional object on a two-dimensional screen, are provided.

The values of such two-dimensional coordinate values and the display information are sent over the internal bus 251 to the bus interfacing unit 11, under control of the controller 13, and are then supplied over the main bus 6 to the picture generating apparatus. In the picture generating apparatus, the two-dimensional coordinate values and the display information sent thereto are sent to a raster processor 8 under control of the CPU 1. Using the two-dimensional coordinate values and the display information, the raster processor 8 generates a three-dimensional picture displayed on a two-dimensional screen by drawing on a video RAM 5. The three-dimensional picture, thus generated, is displayed on an external display unit (not shown) having a two-dimensional screen.

The video information processor shown in FIG. 2 stores the display information or the three-dimensional coordinates of plural points making up the object as three-data value sets. These registers 21, 22 are as shown in Tables 1 and 2:

TABLE 1

|     |     |     |     |
| --- | --- | --- | --- |
| $MT_1$ | $M_{111}$ | $M_{112}$ | $M_{113}$ |
|     | $M_{121}$ | $M_{122}$ | $M_{123}$ |
|     | $M_{131}$ | $M_{132}$ | $M_{133}$ |
| $MT_2$ | $M_{211}$ | $M_{212}$ | $M_{213}$ |
|     | $M_{221}$ | $M_{222}$ | $M_{223}$ |
|     | $M_{231}$ | $M_{232}$ | $M_{233}$ |
| $MT_3$ | $M_{311}$ | $M_{312}$ | $M_{313}$ |
|     | $M_{321}$ | $M_{322}$ | $M_{323}$ |
|     | $M_{331}$ | $M_{332}$ | $M_{333}$ |

TABLE 2

|     |     |     |     |
| --- | --- | --- | --- |
| $VT_1$ | $V_1X_0$ | $V_1Y_0$ | $V_1Z_0$ |
|     | $V_1X_1$ | $V_1Y_1$ | $V_1Z_1$ |
|     | $V_1X_2$ | $V_1Y_2$ | $V_1Z_2$ |
| $VT_2$ | $V_2X_0$ | $V_2Y_0$ | $V_2Z_0$ |
|     | $V_2X_1$ | $V_2Y_1$ | $V_2Z_1$ |
|     | $V_2X_2$ | $V_2Y_2$ | $V_2Z_2$ |
| $VT_3$ | $V_3X_0$ | $V_3Y_0$ | $V_3Z_0$ |
|     | $V_3X_1$ | $V_3Y_1$ | $V_3Z_1$ |
|     | $V_3X_2$ | $V_3Y_2$ | $V_3Z_2$ |

Each of two sets of registers, shown in Tables 1 and 2, has three registers in a horizontal row, so that it is made up of three sets or three rows each comprised of three registers. That is, each of the two registers has a matrix structure of three rows and three columns (3 3). Specifically, the register 21 shown in Table 1 is made up of three register sets $MT_1$, $MT_2$ and $MT_3$, and each of the register sets $MT_1$, $MT_2$ and $MT_3$ is made up of nine registers, in which scalar values of the vector, instead of the vector components, are stored. The register 22 shown in Table 2 is made up of three register sets $VT_1$, $VT_2$ and $VT_3$, and each of the register sets $VT_1$, $VT_2$ and $VT_3$ is made up of nine registers, in which vector components of three, three-dimensional vectors are stored.

Before proceeding to detailed explanation of the processing of the picture information of an object displayed on a two-dimensional screen in the picture information processor 2, the basic processing operations for the picture information for displaying an object on a two-dimensional screen, in accordance with the present invention, will be explained.

Among coordinate systems representing three-dimensional space, there are a so-called local coordinate system or an object coordinate system, representing the shape or the size of a three-dimensional object itself, a world coordinate system representing the position of a three-dimensional object placed in a space, and an eye point coordinate system or a so-called screen coordinate system for representing a three-dimensional object on a screen, with the eye point being on a point of origin (O, O, O). For representing an object represented on a local coordinate system as a picture, projection transformation from three-dimensional projection to two-dimensional projection is performed. Such projection transformation is carried out via multiplication by the rotation matrix of three rows and three columns (3 3) and addition of a three-dimensional translation matrix.

A three-dimensional object drawn on the screen coordinate system is represented by small-sized polygons as basic figures. The shape, position, orientation, color or the pattern of these polygons is given as picture data for generating a picture, or so-called polygon data. The shape, position and the orientation of the polygons are determined by the coordinates of the apex points of the polygon. For purposes of explanation, a polygon is assumed to be a triangle, by way of example. However, it will be appreciated that any n-sided polygon may be used.

The coordinates of the apex points of the polygon constituting an object 101 are usually represented by a local coordinate system, as shown in FIG. 3A. For displaying the object 101 represented by the local coordinate system on a screen, the coordinates in the local coordinate system, representing the object 101, are first transformed into coordinates in the world coordinate system of FIG. 3B. If the rotational direction of the object 101 in the local coordinate system representing the object 101 is LW, the local/world coordinate transformation matrix for transforming the coordinate of the object 101 from the local coordinate system to the world coordinate system may be found by the equation (1):

$$\begin{bmatrix} LW_{11}, LW_{12}, LW_{13} \\ LW_{21}, LW_{22}, LW_{23} \\ LW_{31}, LW_{32}, LW_{33} \end{bmatrix} = \begin{bmatrix} 1, & 0, & 0 \\ 0, & \cos\phi x, & \sin\phi x \\ 0, & -\sin\phi x, & \cos\phi x \end{bmatrix} \quad (1)$$

$$\begin{bmatrix} \cos\phi y, & 0, & \sin\phi y \\ 0, & 1, & 0 \\ -\sin\phi y, & 0, & \cos\phi y \end{bmatrix} \begin{bmatrix} \cos\phi z, & \sin\phi z, & 0 \\ -\sin\phi z, & \cos\phi z, & 0 \\ 0, & 0, & 1 \end{bmatrix}$$

The local/world coordinate transformation matrix, as described by equation (1), is multiplied with a position vector TL in the local coordinate system made up of components (TLx, TLy, TLz). The coordinates representing the object 101 are transformed from the local coordinate system of FIG. 3A to the world coordinate system of FIG. 3B, as may be seen from the following equation (2):

$$\begin{bmatrix} LW_{11}, LW_{12}, LW_{13} \\ LW_{21}, LW_{22}, LW_{23} \\ LW_{31}, LW_{32}, LW_{33} \end{bmatrix} \begin{bmatrix} TLX \\ TLY \\ TLZ \end{bmatrix} \quad (2)$$

In this manner, the motion and the position of an object in a three-dimensional space is represented by a value set of the matrix and the vector.

The world coordinate system LZ of FIG. 3B is then transformed into the screen coordinate system WZ. If the rotational direction of the object 101 in the world coordinate system is WS, the world/screen coordinate transformation matrix for transforming the coordinates of the object 101 from the world coordinate system to the screen coordinate system Is described by the following equation (3):

$$\begin{bmatrix} WS_{11}, WS_{12}, WS_{13} \\ WS_{21}, WS_{22}, WS_{23} \\ WS_{31}, WS_{32}, WS_{33} \end{bmatrix} = \begin{bmatrix} 1, & 0, & 0 \\ 0, & \cos\phi x, & \sin\phi x \\ 0, & -\sin\phi x, & \cos\phi x \end{bmatrix} \quad (3)$$

$$\begin{bmatrix} \cos\phi y, & 0, & \sin\phi y \\ 0, & 1, & 0 \\ -\sin\phi y, & 0, & \cos\phi y \end{bmatrix} \begin{bmatrix} \cos\phi z, & \sin\phi z, & 0 \\ -\sin\phi z, & \cos\phi z, & 0 \\ 0, & 0, & 1 \end{bmatrix}$$

The coordinate representing the object 101 is transformed from the world coordinate system WZ of FIG. 3B to the screen coordinate system WZ by the following equation (4) for multiplying the world/screen coordinate transformation matrix of the equation (3) with the position vector TW in the world coordinate system made up of the components (TWx, TWy, TWz):

$$\begin{bmatrix} WS_{11}, WS_{12}, WS_{13} \\ WS_{21}, WS_{22}, WS_{23} \\ WS_{31}, WS_{32}, WS_{33} \end{bmatrix} \begin{bmatrix} TWX \\ TWY \\ TWZ \end{bmatrix} \quad (4)$$

FIGS. 3Ca and 3Cb are a perspective view and a top plan view showing a screen coordinate system, respectively. In FIG. 3Cb, if the eye point, which is a point of origin, is Q, the distance of the object 101 from the eye point Q is h. The screen shown in FIG. 3D is arrayed at the position of the distance h.

The rotation matrix of the polygon constituting the object 101 in the transformation from the local coordinate system to the screen coordinate system is described by the following equation (5) for multiplying the two coordinate transformation matrices of equations (1) and (3) based on the rotation in the directions X, Y, and Z:

$$\begin{bmatrix} R_{11}, R_{12}, R_{13} \\ R_{21}, R_{22}, R_{23} \\ R_{31}, R_{32}, R_{33} \end{bmatrix} = \begin{bmatrix} WS_{11}, WS_{12}, WS_{13} \\ WS_{21}, WS_{22}, WS_{23} \\ WS_{31}, WS_{32}, WS_{33} \end{bmatrix} \begin{bmatrix} LW_{11}, LW_{12}, LW_{13} \\ LW_{21}, LW_{22}, LW_{23} \\ LW_{31}, LW_{32}, LW_{33} \end{bmatrix} \quad (5)$$

If the coordinate of the eye point at the time of transforming from the local coordinate system to the world coordinate system is a vector TL having components (TLx, TLy, TLz), the coordinate of the eye point at the time of transforming from the world coordinate system to the screen coordinate system is a vector TL having components (TWx, TWy, TWz), and the coordinate of the eye point of each point of the polygon constituting the object 101 at the time of transforming from the local coordinate system to the screen coordinate system is a vector Tr, the components of the vector Tr of the coordinate point of this eye point is described by the following equation (6) for multiplying the world/screen coordinate transformation matrix of equation (3) by the vector TL and adding the resulting product to the vector TW:

$$\begin{bmatrix} TrX \\ TrY \\ TrZ \end{bmatrix} = \begin{bmatrix} WS_{11}, WS_{12}, WS_{13} \\ WS_{21}, WS_{22}, WS_{23} \\ WS_{31}, WS_{32}, WS_{33} \end{bmatrix} \begin{bmatrix} TLX \\ TLY \\ TLZ \end{bmatrix} + \begin{bmatrix} TWX \\ TWY \\ TWZ \end{bmatrix} \quad (6)$$

Thus, if the three apex points of the polygon constituting the object 101 are V0, V1 and V2, and the coordinates of the three-dimensional apex points are denoted (VXn, VYn, VZn), where n=0, 1, 2, the rotation matrix as found by equation (5) is multiplied with the coordinates of the apex points of the point V and the resulting product is summed with the coordinate vector Tr of the eye point as determined by equation (6). As a result, the three-dimensional coordinate values of the points making up the object 101, as transformed from the local coordinate system to the screen coordinate system, is described by the following equation (7):

$$\begin{bmatrix} SSX_n \\ SSY_n \\ SZ_n \end{bmatrix} = \begin{bmatrix} R_{11}, R_{12}, R_{13} \\ R_{21}, R_{22}, R_{23} \\ R_{31}, R_{32}, R_{33} \end{bmatrix} \begin{bmatrix} VX_n \\ VY_n \\ VZ_n \end{bmatrix} + \begin{bmatrix} TrX \\ TrY \\ TrZ \end{bmatrix} \quad (7)$$

The three-dimensional coordinate values, obtained from equation (7), specify what three-dimensional position is assumed by the object in the screen coordinate system. In the above equation, n is a variable assuming a value from 0 to 2.

Using the three-dimensional value obtained by the equation (7), isometric transformation from three-dimensional space to two-dimensional space is carried out by the processing operations shown by the equations (8) and (9):

$$SXn = 0FX + SSXn \times (h/SZn) \quad (8)$$

$$Syn = 0FY + SSYn \times (h/SZn) \quad (9)$$

This determines the two-dimensional coordinate values of the object projected on the two-dimensional screen.

The values OFX and OFY used in equations (8) and (9) are two-dimensional values representing offset values in the X and Y directions on position movement.

In this manner, by finding two-dimensional coordinate values of plural points making up an object, projected on a two-dimensional screen, using three-dimensional coordinate values of the 3-row-3-column matrix, and by arraying the plural two-dimensional coordinate values thus found on a screen of FIG. 3D, the three-dimensional picture of the object 101 may be generated and displayed on the two-dimensional coordinate system of FIG. 3E.

An actual object is constituted by plural surfaces whose illumination is varied in the manner by which they are illuminated by the light source. The manner of illumination with light, that is the penumbra produced on illuminating a three-dimensional object with light, needs to be sequentially calculated responsive to position movement of the light source or the object, to change surface lightness using the results of the calculations. The method of calculation for finding the penumbra of the surfaces is termed light source calculations. By carrying out these light source calculations, an object can be rendered three-dimensional when viewed.

Although there are a variety of methods for light source calculations, three methods, that is, flat shading, gouraud shading and depth cuing, may be used in the video information processor of the present embodiment. With flat shading, a normal line vector is allotted to each polygon and the color and lightness of the polygon is determined by the scalar product thereof with the light source vector. With gouraud shading, a normal line vector is allotted to each apex point of the polygon, the color and lightness of which is determined by the scalar product thereof with the light source vector, with the color and the lightness being interpolated for producing smooth gradation in the polygon. With depth cuing, the color or the lightness is changed with the distance from the eye point. The depth cuing has an effect of color fusion to a pre-set distant color. It is possible with depth cuing to produce light attenuation by atmospheric air, a so-called fog effect, by causing the color and lightness of the object to approach the background color as the object is moved away from the eye point.

With the video information processor of the present embodiment, three light sources are used, and the values of these three light sources are calculated together in order to find the color values.

It is assumed that an object 102 having three inherent colors of R, G and B is illuminated with three colors of R, G and B by light beams from plural light sources L1, L2, L3. These light sources L1, L2, L3 are composed of respective directions and color components. The light source L1 has the vectors of the direction (L1x, L1y, L1z) and the colors (LR1, LG1, LB1). The light source L2 has the vectors of the direction (L2x, L2y, L2z) and the colors (LR2, LG2, LB2) and the light source L3 has the vectors of the direction (L3x, L3y, L3z) and the colors (LR3, LG3, LB3).

The coordinate matrix representing the colors of the three light sources L1, L2, L3 may be found by the following equation (10) for multiplying the matrix of the vector of the directions of the three light sources with the local/world coordinate transformation matrix obtained by equation (1):

$$\begin{bmatrix} L_{11}, L_{12}, L_{13} \\ L_{21}, L_{22}, L_{23} \\ L_{31}, L_{32}, L_{33} \end{bmatrix} = \begin{bmatrix} L_{1x}, L_{1y}, L_{1z} \\ L_{2x}, L_{2y}, L_{2z} \\ L_{3x}, L_{3y}, L_{3z} \end{bmatrix} \begin{bmatrix} LW_{11}, LW_{12}, LW_{13} \\ LW_{21}, LW_{22}, LW_{23} \\ LW_{31}, LW_{32}, LW_{33} \end{bmatrix} \quad (10)$$

The coordinate matrix representing the colors of the light sources L1, L2, L3 denotes the direction of parallel light beams of the respective light sources.

If the vector of a pre-set normal line for the object 102 is N, and the components of this normal line vector N are (Nx, Ny, Nz), the scalar product of the three light sources is determined by the following equation (11) for multiplying the coordinate matrix representing the colors of the three light sources L1, L2, L3 obtained by equation (10) with the components of the normal line vector N:

$$\begin{bmatrix} IP_{1n} \\ LP_{2n} \\ IP_{3n} \end{bmatrix} = \begin{bmatrix} L_{11}, L_{12}, L_{13} \\ L_{21}, L_{22}, L_{23} \\ L_{31}, L_{32}, L_{33} \end{bmatrix} \begin{bmatrix} NX_n \\ NY_n \\ NZ_n \end{bmatrix} \quad (11)$$

If now the coordinate matrix of color components of three light sources L1, L2, L3 is multiplied by the scalar product values of the three light sources obtained by equation (11), and the resulting product is summed to the ambient light BK made up of the components (RBK, GBK, BBK) of the object 102, the color of the three light sources L1, L2, L3 may be found by the following equation (12):

$$\begin{bmatrix} RLT_n \\ GLT_n \\ BLT_n \end{bmatrix} = \begin{bmatrix} LR_1, LR_2, LR_3 \\ LG_1, LG_2, LG_3 \\ LB_1, LB_2, LB_3 \end{bmatrix} \begin{bmatrix} IP_{1n} \\ IP_{2n} \\ IP_{3n} \end{bmatrix} + \begin{bmatrix} RBK \\ GBK \\ BBK \end{bmatrix} \quad (12)$$

Approximation calculations may be made in equation (12) in conformity to the material type by the following equation (13) using each component of the scalar products multiplied by itself m times in place of the scalar products of the three light sources obtained by equation (11):

$$\begin{bmatrix} RLT_n \\ GLT_n \\ BLT_n \end{bmatrix} = \begin{bmatrix} LR_1, LR_2, LR_3 \\ LG_1, LG_2, LG_3 \\ LB_1, LB_2, LB_3 \end{bmatrix} \begin{bmatrix} IP_{1n}^m \\ IP_{2n}^m \\ IP_{3n}^m \end{bmatrix} \quad (13)$$

Specifically, the color of the light source LT in which the range with the maximum light intensity is narrow, such as metal luster, may be found.

The components ($R_n$, $G_n$, $B_n$) of the color change values by depth changes at a point P may be found by the following equation (14), in which interpolation is carried out using the color of the light beam LT derived form the light sources L1, L2, L3 obtained by equation (12) multiplied by color components (R, G, B) of respective points of the triangle constituting the object and components of the most distant colors FC (RFC, GFC, BFC):

$$\begin{bmatrix} R_n \\ G_n \\ B_n \end{bmatrix} = (1 - P_n) \begin{bmatrix} R \times RLT_n \\ G \times GLT_n \\ B \times BLT_n \end{bmatrix} + P_n \begin{bmatrix} RFC \\ GFC \\ BFC \end{bmatrix} \quad (14)$$

$$= \begin{bmatrix} R \times RLT_n \\ G \times GLT_n \\ B \times BLT_n \end{bmatrix} + P_n \left[ \begin{bmatrix} RFC \\ GFC \\ BFC \end{bmatrix} - \begin{bmatrix} R \times RLT_n \\ G \times GLT_n \\ B \times BLT_n \end{bmatrix} \right]$$

Although the components ($R_n$, $G_n$, $B_n$) of the color change values by depth, changes may be found linearly, a parameter $P_n$, which is a function of a distance from the eye point, is used in equation (14) for non-linear approximation. This parameter $P_n$ is determined by the following equation (15):

$$P_n = DQB + DQA \times (h/SZ_n) \quad (15)$$

In equation (14), DQA, DQB are constants which are changed in value with changes in depth and which remain constant for representing a three-dimensional picture with a constant depth.

By performing calculations using the display information and three-dimensional coordinates of plural points constituting the object, it becomes possible to obtain the display information, that is, the color information, which is the light value information, and two-dimensional coordinate values of respective points of plural polygons constituting the object for displaying the three-dimensional object on a two-dimensional screen.

The processing operation of equation (3) is performed from one display scene to another, while the processing operation of equations (1), (5), (6), (9) and (10) and that of equations (7), (8), (9), (11), (12), (13), (14) and (15) are, respectively, performed from one display object to another and from one polygon to another.

The above processing operations are performed for each apex point of the polygon. The value specifying each apex point of the polygon is substituted for the variable used. Since the polygon used in the present embodiment is a triangle, one of three values specifying its three apex points is substituted for the variable.

Plural commands used in a matrix processor 4 are next explained.

Table 3 shows commands for processing scaler and vector values, while Tables 4 and 5 show commands for calculations of coordinate values and those for light source calculations, respectively.

TABLE 3

$$CM_i(x3) \begin{vmatrix} V_o X_n = M_{i11} \times V_j X_n + M_{i12} \times V_j Y_n + M_{i13} \times V_j Z_n \\ V_o X_n = M_{i21} \times V_j X_n + M_{i22} \times V_j Y_n + M_{i23} \times V_j Z_n \\ V_o X_n = M_{i31} \times V_j X_n + M_{i32} \times V_j Y_n + M_{i33} \times V_j Z_n \end{vmatrix}$$

$$CM_2(x3) \begin{vmatrix} M_{o1n} = M_{i11} \times M_{j1n} + M_{i12} \times M_{j2n} + M_{i13} \times M_{j3n}; \\ M_{o2n} = M_{i21} \times M_{j1n} + M_{i22} \times M_{j2n} + M_{i23} \times M_{j3n}; \\ M_{o3n} = M_{i31} \times M_{j1n} + M_{i32} \times M_{j2n} + M_{i33} \times M_{j3n}; \end{vmatrix}$$

TABLE 4

$$CT_1(x3) \begin{vmatrix} SSX_n = TrX + R_{11} \times VX_n + R_{12} \times VY_n + R_{13} \times VZ_n; \\ SSY_n = TrY + R_{21} \times VX_n + R_{22} \times VY_n + R_{23} \times VZ_n; \\ SZ_n = TrZ + R_{31} \times VX_n + R_{32} \times VY_n + R_{33} \times VZ_n; \end{vmatrix}$$

$$CT_2(x3) \begin{vmatrix} SX_n = OFX + SSX_n \times (h/SZ_n); \\ SY_n = OFY + SSY_n \times (h/SZ_n); \\ P_n = DQB + DQA \times (h/SZ_n); \end{vmatrix}$$

$$CT_3(x3) \begin{vmatrix} SSX_n = TrX + R_{11} \times VX_n + R_{12} \times VY_n + R_{13} \times VZ_n; \\ SSY_n = TrY + R_{21} \times VX_n + R_{22} \times VY_n + R_{23} \times VZ_n; \\ SZ_n = TrZ + R_{31} \times VX_n + R_{32} \times VY_n + R_{33} \times VZ_n; \\ SX_n = OFX + SSX_n \times (h/SZ_n); \\ SY_n = OFY + SSY_n \times (h/SZ_n); \\ P_n = DQB + DQA \times (h/SZ_n); \end{vmatrix}$$

TABLE 5

$$CL_1(x3) \begin{vmatrix} IP_{1n} = L_{11} \times NX_n + L_{12} \times NY_n + L_{13} \times NZ_n; \\ IP_{2n} = L_{21} \times NX_n + L_{22} \times NY_n + L_{23} \times NZ_n; \\ IP_{3n} = L_{31} \times NX_n + L_{32} \times NY_n + L_{33} \times NZ_n; \end{vmatrix}$$

$$CL_2(x3) \begin{vmatrix} RLT_n = RBK + LR_1 \times IP_{1n} + LR_2 \times IP_{2n} + LR_3 \times IP_{3n} \\ GLT_n = GBK + LG_1 \times IP_{1n} + LG_2 \times IP_{2n} + LG_3 \times IP_{3n} \\ BLT_n = BBK + LB_1 \times IP_{1n} + LB_2 \times IP_{2n} + LB_3 \times IP_{3n} \end{vmatrix}$$

$$CL_3(x3) \begin{vmatrix} R_n = R \times RLT_n + P_n \times (RFC - R \times RLT_n); \\ G_n = G \times GLT_n + P_n \times (GFC - G \times GLT_n); \\ B_n = B \times BLT_n + P_n \times (BFC - B \times BLT_n); \end{vmatrix}$$

$$CL_4(x3) \begin{vmatrix} IP_{1n} = L_{11} \times NX_n + L_{12} \times NY_n + L_{13} \times NZ_n; \\ IP_{2n} = L_{21} \times NX_n + L_{22} \times NY_n + L_{23} \times NZ_n; \\ IP_{3n} = L_{31} \times NX_n + L_{32} \times NY_n + L_{33} \times NZ_n; \\ RLT_n = RBK + LR_1 \times IP_{1n} + LR_2 \times IP_{2n} + LR_3 \times IP_{3n} \\ GLT_n = GBK + LG_1 \times IP_{1n} + LG_2 \times IP_{2n} + LG_3 \times IP_{3n} \\ BLT_n = BBK + LB_1 \times IP_{1n} + LB_2 \times IP_{2n} + LB_3 \times IP_{3n} \\ R_n = R \times RLT_n + P_n \times (RFC - R \times RLT_n); \\ G_n = G \times GLT_n + P_n \times (GFC - G \times GLT_n); \\ B_n = B \times BLT_n + P_n \times (BFC - B \times BLT_n); \end{vmatrix}$$

Specifically, the command, CM1, in Table 3 is a command specifying the calculation of equation (10), that is, the calculations of multiplying the matrix with the vector, while the command CM2 is a command specifying the calculations of equations (1), (3) and (5), that is, the calculations of multiplying matrices with each other. The command, CT1, in Table 4 is a command specifying the calculations of equations (6) and (7), that is, the calculations of coordinate transformation, while the command, CT2, is a command specifying the calculations of equations (8), (9) and (15), that is, the calculations of isometric transformation. The command, CL1, of Table 5 is a command for the calculating scalar product of the light source and the normal line, while the command, CL2, is a command specifying the calculations of equations (12) and (13). The command, CL3, is a command specifying calculations of the equation (14), that is the calculations of interpolation of the distant color and the near color, while the command, CL4, is a command for collectively executing the commands, CL1, CL2, CL3 and CL4.

In the above command, CM1, one of the values of 1 to 3 is substituted for the variable, i, in association with the matrices, MT1 to MT3, while one of the values of 1 to 3 is substituted for the variable, j, in association with the matrices, VT1 to VT3, having vector values. One of the values of 0 to 2 indicating three apex points of a triangle is substituted for variables, o and n, of the three values, VoXn, VoYn, VoZn, to be found.

In the command, CM2, similarly to the command, CM1, one of the values of 1 to 3 is substituted for variables, i and j, while one of the values of 0 to 2 is substituted for variables, o and n, of the three values, MoXn, MoYn and MoZn, to be found.

All of the above commands may be executed uniquely or three times, that is, once for each of the three apex points of the triangle. If the commands are executed once three times, the values of 0 to 2, specifying the three apex points of the polygon, are substituted for the variable for executing the commands.

In the matrix processor 20 of FIG. 1, data for executing the above calculations is sent to and stored in respective registers of the register sets over the internal bus 251. The respective registers making up the register sets MT1, MT2, MT3, VT1, VT2 and VT3 are allocated for storing pre-set data. These pre-set data values are data stored in the main memory 3 and adapted to be read out under control of the CPU 1, or data resulting from calculations executed using the read-out data.

Specifically, Table 6 shows data allocation to the respective registers in the case of coordinate calculations for the respective points making up the polygon.

TABLE 6

| | | | |
|---|---|---|---|
| MT$_1$ | $R_{11}$ | $R_{12}$ | $R_{13}$ |
| | $R_{21}$ | $R_{22}$ | $R_{23}$ |
| | $R_{31}$ | $R_{32}$ | $R_{33}$ |
| MT$_2$ | TrX | TrY | TrZ |
| | OFX | OFY | DQB |
| | h | DQA | |
| VT$_1$ | $VX_0$ | $VY_0$ | $VZ_0$ |
| | $VX_1$ | $VY_1$ | $VZ_1$ |
| | $VX_2$ | $VY_2$ | $VZ_2$ |
| VT$_2$ | $SSX_0$ | $SSY_0$ | $SZ_0$ |
| | $SSX_1$ | $SSY_1$ | $SZ_1$ |
| | $SSX_2$ | $SSY_2$ | $SZ_2$ |
| VT$_3$ | $SX_0$ | $SY_0$ | $P_0$ |
| | $SX_1$ | $SY_1$ | $P_1$ |
| | $SX_2$ | $SY_2$ | $P_2$ |

To the respective registers of the register set MT1, there are allocated scalar values of the rotation matrix found by equation (5), whereas, to the registers of the register set MT2, there are set respective components of the translation vector Tr found by equation (6), two-dimensional offset values OFX and OFY, values DQA and DQB and the value of the distance h. To the respective registers of the register set VT1, there are allocated vector values of three apex points V0, V1 and V2 of a triangle, as a polygon, whereas, to the respective registers of the register set VT2, there are set three-dimensional coordinate values of the screen coordinate system as determined by equation (7). To the respective registers of the register set VT$_3$, there are allocated parameters Pn and three-dimensional coordinate values as determined by equations (8), (9) and (15) for the three apex points of the polygon V0, V1 and V2.

Meanwhile, the scalar values of the rotation matrix stored in the registers of the register set MT1 are determined by multiplying the local/world coordinate transformation matrix as found by equation (1) with the world/screen coordinate transformation matrix as found by equation (3) in accordance with the command CM2. On the other hand, the local/world coordinate transformation matrix as determined by equation (1) and the world/screen coordinate transformation matrix as found by equation (3) are also found in accordance with the command, CM2. Consequently, the scalar values of the rotation matrix, as found by calculating the local/world coordinate transformation matrix and the world/screen coordinate transformation matrix by the matrix processor 20 in accordance with the command, CM2, and by multiplying the calculated local/world coordinate transformation matrix and the calculated world/screen coordinate transformation matrix with each other, are stored in the respective registers of the register sets MT1.

Illustrative processing for coordinate calculations is next explained.

For calculating the coordinates of respective points of a polygon, the calculations of equation (7) are executed, and the resulting three-dimensional coordinate values are stored in the respective registers of the register set VT2. The calculations of equation (8) are then executed for calculating the two-dimensional coordinate values of the points. The resulting vector values are stored in the registers of the register set VT3.

First, in multiplying the rotation matrix of the register set MT1 with the vector values of the register set VT1, the scaler values of the rotation matrix stored in the register set MT1 are sent to and stored in registers 321, 322 and 333 each being capable of storing sets of three data values. That is, data stored in registers M111, M112, M113 are sequentially stored in the register 321, data stored in registers M121, M122, M123 are sequentially stored in the register 322, and data stored in registers M131, M132, M133 are sequentially stored in the register 32$_3$. The data stored in the registers 321, 322 and 333 are sent, from the first data first, to multipliers 341, 342 and 343, respectively.

A string of data stored in the register set VT1 is sequentially sent to the multipliers 341, 342 and 343 of calculation units 301, 302 and 303, respectively. That is, data of the registers V1X0, V1Y0, V1Z0 of the first row of the register set VT1 are sent to the multipliers 341, 342 and 343, respectively, where the two sorts of data are multiplied with each other. That is, in the calculation unit 301, the multiplier 341 executes the multiplication of M133*VZ0. The result of multiplication is sent to an adder/subtractor 351 where it is summed to TrX stored in the register 311. Then, at the multiplier 341, multiplication of M112*VY0 is performed. The result is sent to the adder/subtractor 351 where it is summed to the result of previous calculations of TrX+ M113*VZ0 sent via selector 331. Then, at the multiplier 341, multiplication of M112*VX0 is executed. The result of multiplication is sent to the adder/subtractor 351 where it is summed to the result of previous calculations of (TrX+M113*VZ0)+M112*VY0 sent via selector 331 to obtain the result ((TrX+M113*VZ0)+M112*VY0)+M111*VXo. The result of calculations is stored as SSX0 in V2X0 of the register set $VT_2$ over the internal bus 251.

In the calculation unit 302, the multiplier 342 executes the multiplication of M123*VZ0. The result of this multiplication is sent to an adder/subtractor 352 where it is summed to TrY stored in the register 312. Then, at the multiplier 342, multiplication of M122*VY0 is performed. The result is sent to the adder/subtractor 352 where it is summed to the result of previous calculations of TrX+M123*VZ0 sent via selector 332. Then, at the multiplier 342, multiplication of M121*VX0 is executed. The result of multiplication is sent to an adder/subtractor 352 where it is summed to the result of previous calculations of (TrX+M123*VZ0)+M122*VY0 sent via selector 332 to obtain the result ((TrX+M123*VZ0)+M122*VY0)+M121*VX0. The result of calculations is stored as SSY0 in V2Y0 of the register set $VT_2$ over the internal bus 251.

In the calculation unit 303, the multiplier 343 executes the multiplication of M133*VZ0. The result of this multiplication is sent to an adder/subtractor 353 where it is summed to TrZ stored in the register 313. Then, at the multiplier 343, multiplication of M132*VY0 is performed. The result is sent to the adder/subtractor 353 where it is summed to the result of previous calculations of TrX+M133*VZ0 sent via selector 333. Then, at the multiplier 343, multiplication of M131*VX0 is executed. The result of this multiplication is sent to an adder/subtractor 353 where it is summed to the result of previous calculations of (TrX+M123*VZ0)+M122*VY0 sent via selector 332 to obtain the result ((TrX+M133*VZ0)+M132*VY0)+M131*VX0. The result of these calculations are stored as SZ0 in V2Z0 of the register set $VT_2$ over the internal bus 251.

The calculations by the calculation units 301, 302, 303 are executed in parallel.

Then, data of second row resisters V1X1, V1Y1, V1Z1 of the register set VT1 are sent to the calculation units 301, 302, 303 for calculations. That is, the apex point vectors VX1, VY1, VZ1 are sent to the calculation units 301, 302, 303 for deriving ((TrX+M113*VZ3)+M112*VY1)+M111*VX1, ((TrX+M123*VZ1)+M122*VY1)+M121*VX1 and ((TrX+M133*VZ1)+M132*VY1)+M131*VX1. These results of calculations are stored as SSX1, SSY1, SZ1 in V2X1, V2Y1 and V2Z1 of the register set $VT_2$ over the internal bus 251, respectively.

Then, data of third row resisters V1X2, V1Y2, V1Z2 of the register set VT1 are sent to the calculation units 301, 302, 303 for calculations. That is, the apex point vectors VX2, VY2, VZ2 are sent to the calculation units 301, 302, 303 for deriving ((TrX+M113*VZ2)+M112*VY2)+M111*VX2, ((TrX+M123*VZ2)+M122*VY2)+M121*VX2 and ((TrX+M133*VZ2)+M132*VY2)+M131*VX2. These results of calculations are stored as SSX2, SSY2, SZ2 in V2X2, V2Y2 and V2Z2 of the register set $VT_2$ over the internal bus 251, respectively.

In this manner, the three-dimensional coordinate values of the screen coordinate system of equation (7) are determined for each of the three points making up the triangle of the polygon.

The vector value SZo of the results of the calculations are sent to a divider 23. In the register 24 is stored the value of the distance h sent from the register M231 of the register set MT2. The divider 23 divides the value of the distance h from the register 24 with the vector value SZo. The results of the calculations are sent over the internal bus 253 and registers 321, 322 and 323 to the multipliers 341, 342 and 343, respectively.

These multipliers 341, 342 and 343 are fed with the vector values SSXo, SSYo and DQA stored in the register set $VT_2$ over the internal bus 252 so that the quotients from the divider 23 are multiplied with the vector values SSX0, SSYo and DQA. The resulting products are sent to the adders/subtractors 351, 352 and 353.

The values OFX, OFY and DQB, respectively stored in the registers M221, M222, M223, are respectively stored over the internal bus 253 in the registers 311, 312 and 313, respectively. These values are sent over the selectors 331, 332 and 333 to the adder/subtractors 351, 352 and 353 so as to be summed to the results of multiplication from the multipliers 341, 342, and 343, respectively.

In this manner, the two-dimensional coordinate values SXo, SYo and the parameters Po of the apex points of the triangle of the polygon are outputted from the adder/subtractors 351, 352 and 353, respectively, so as to be stored in the registers V3X0, V3Y0, V3Z0 of the register set $VT_3$, respectively. Similarly, the two-dimensional coordinate values SX1, SY1, P1 and SX2, SY2, P2 of the apex points of the triangle of the polygon are found and stored in the registers V3X1, V3Y1, V3Zl, V3X2, V3Y2, V3Z2 of the register set VT3.

Table 7 shows data allocation to respective registers at the time of light source calculations.

TABLE 7

|  | | | |
|---|---|---|---|
| $MT_1$ | $L_{11}$ | $L_{12}$ | $L_{13}$ |
|  | $L_{21}$ | $L_{22}$ | $L_{23}$ |
|  | $L_{31}$ | $L_{32}$ | $L_{33}$ |
| $MT_2$ | $LR_1$ | $LG_1$ | $LB_1$ |
|  | $LR_2$ | $LG_2$ | $LB_2$ |
|  | $LR_3$ | $LG_3$ | $LB_3$ |
| $MT_3$ | R | G | B |
|  | RBX | GBK | BBK |
|  | RFC | GFC | BFC |
| $VT_1$ | $NX_0$ | $NY_0$ | $NZ_0$ |
|  | $NX_1$ | $NY_1$ | $NZ_1$ |
|  | $NX_2$ | $NY_2$ | $NZ_2$ |
| $VT_2$ | $IP_{10}$ | $IP_{20}$ | $IP_{30}$ |
|  | $IP_{11}$ | $IP_{21}$ | $IP_{31}$ |
|  | $IP_{12}$ | $IP_{22}$ | $IP_{32}$ |
| $VT_2$ | $RLT_0$ | $GLT_0$ | $BLT_0$ |
|  | $RLT_1$ | $GLT_1$ | $BLT_1$ |
|  | $RLT_2$ | $GLT_2$ | $BLT_2$ |
| $VT_2$ | $R_0$ | $G_0$ | $B_0$ |
|  | $R_1$ | $G_1$ | $B_1$ |
|  | $R_2$ | $G_2$ | $B_2$ |

To the respective registers of the register set $MT_1$, there are allocated the coordinate matrices representing the colors of the three light sources L1, L2 and L3 as found by equation (10), whereas, to the respective registers of the register set MT2, there are allocated the coordinate matrices representing the colors of the three light sources L1, L2 and L3 as determined by equation (12). To the respective registers of the register set $MT_3$, there are allocated coordinate matrices of the components of the colors (R, G, B) components of the ambient light BN (RBK, GBK, BBK) and the components of the furthest colors FC (RFC, GFC, BFC), whereas, to the registers of the register set $VT_1$, there are allocated vectors of the pre-set normal line used in equation (11).

Of these values, the values of the respective registers of the register sets MT1 and VT1 are used for calculating equation (11) in the calculating units 301, 302 and 303. The scaler product values of the three light sources are stored in the respective registers of the register set VT2.

Then, using the scaler product values stored in the register set VT2, coordinate matrices of the color components of the light sources L1, L2 and L3 stored in the registers of the register set $MT_2$ and the components (RBK, GBK and BBK) of the ambient light BK stored in the register set $MT_3$, equations (12) or (13) are calculated by the calculating units 301, 302 and 303 for finding the components of the color LT of the light beams of the three light sources L1, L2 and L3. These values are stored in the register of the register set VT2.

In addition, using the components of the color LT of the light beams of the light sources L1, L2 and L3 stored in the register set VT2, color components (R, G, B) stored in the register set MT3, components (RFC, GFC, BFC) of the furthest color FC and the parameters Pn, equation (14) is calculated by the calculation units 301, 302 and 303 and the resulting values are stored in the respective registers of the register set VT2.

That is, in the light source calculations, the components of the values of color changes of the object are found, with the use of three light sources.

Figure 5:
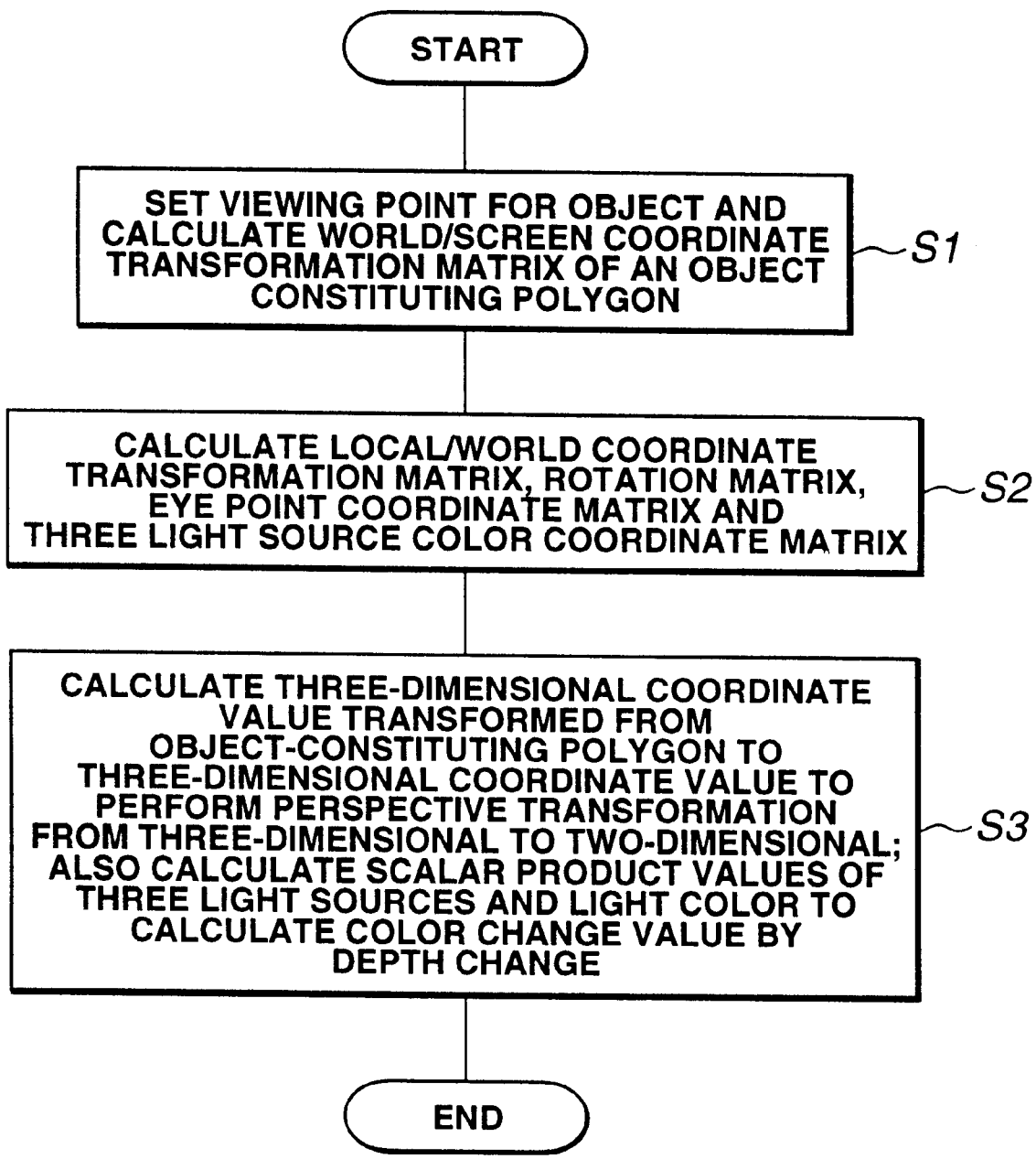
FIG. 5 is a flowchart illustrating the processing sequence of the video information by the video information processing method and apparatus, in accordance with the present invention.

Referring to the flowchart of FIG. 5, the processing sequence of the video information by the above-described video information processor is next explained.

At step S1, the eye point for the object is set. With the field level, the world/screen coordinate transformation matrix is calculated by the equation (3) for plural polygons making up the object.

At step S2, with the object level, the local/world coordinate transformation matrix is calculated for each of the polygons. Using the world/screen coordinate transformation matrix and the local/world coordinate transformation matrix, the rotation matrix for transforming the coordinate system of the object of equation (5) from the local coordinate system to the screen coordinate system, the coordinate matrix of the eye point of equation (6) and the coordinate matrix of the colors of the three light sources of equation (10) are calculated for each polygon.

At step S3, with the polygon level, the three-dimensional coordinate values, transformed from the local coordinate system to the screen coordinate system, are calculated for each polygon by equation (7). Then, isometric transformation to two-dimensional coordinates is done by equations (8) and (9). The two-dimensional coordinate values of the respective points of the plural polygons making up a three-dimensional object, thus obtained, are drawn on a two-dimensional screen for displaying a three-dimensional object on the two-dimensional surface.

The parameters Pn of equation (15) are found at this time for each point of the plural polygons. The scalar products with the use of three light sources according to equation (11) and the colors of the light beams of equations (12) and (13) are calculated. The values of the color changes caused by the depth changes for each polygon or each apex point thereof are calculated. The object color is set by the values of color changes caused by depth changes.

The video information processor is not limited to a coprocessor, but may be configured as a digital signal processor capable of performing independent operations.

Hence, the present invention satisfies a long existing need for a method and apparatus for enhanced image data processing which is accomplished in a more economical, rapid, and efficient manner.

It will be apparent from the foregoing that, while particular forms of the invention have been illustrated and described, various modifications can be made without departing from the spirit and scope of the invention. Accordingly, it is not intended that the invention be limited, except as by the appended claims.

I claim:

1. In a three-dimensional image data processing apparatus, the combination comprising:
   storage means for storing three-dimensional coordinate data of each point of an object constituted by plural points and information data concerning movements of said object, with three data values constituting one data set; and
   means for executing three calculations simultaneously;
   wherein each of the three calculations uses as one parameter the same one of said data values from one of said data sets.

2. The three-dimensional image data processing apparatus as set forth in claim 1, wherein said object is formed by plural polygons and wherein said three-dimensional coordinates are apex point coordinates of said polygons.

3. The three-dimensional image data processing apparatus as set forth in claim 2, wherein said polygon is a triangle.

4. The three-dimensional image data processing apparatus as set forth in claim 3, wherein at least one of said three-dimensional coordinates is a data set of three-row-three-column vectors made up of three three-dimensional vectors.

5. The three-dimensional image data processing apparatus as set forth in claim 1, wherein at least one of the information data sets concerning movements of said object is defined by three-row-three-column scalars.

6. The three-dimensional image data processing apparatus as set forth in claim 5, wherein at least one of the information data sets concerning movements of said object is a rotation matrix made up of three-row-three column scalars.

7. The three-dimensional image data processing apparatus as set forth in claim 1, wherein at least one of said storage means stores a set of three-row-three-column vectors made up of three three-dimensional vectors, and at least one of said storage means stores a rotation matrix made up of three-row-three-column scalars.

8. The three-dimensional image data processing apparatus as set forth in claim 1, wherein said storage means further stores light source color data with three color data values as one data set.

9. The three-dimensional image data processing apparatus as set forth in claim 4, wherein said storage means stores the normal line vector of each apex point of the polygon as a three-row-three-column vector set made up of three, three-dimensional vectors.

10. The three-dimensional image data processing apparatus as set forth in claim 1, wherein at least one of said storage means stores color data of the light sources with three color data values as one data set, at least one of the storage means stores the normal line vector data of each apex point of the polygon as a three-row-three-column vector set made up of three three-dimensional vectors.

11. An apparatus as set forth in any of claims 1–10, wherein said image data is video information.

12. A method for processing three-dimensional image data, comprising the steps of:

storing three-dimensional coordinate data of each point of an object constituted by plural points and information data concerning movements of said object, with three data values constituting one data set; and executing three calculations simultaneously;

wherein each of the three calculations uses as one parameter the same one of said data values from one of said data sets.

13. The method as set forth in claim 12, wherein said storage step stores the coordinate vector of each apex point of the polygon as a three-row-three-column vector set made up of three three-dimensional vectors.

14. The method as set forth in claim 12, wherein said storage step stores a rotation matrix made up of three-row-three-column scalars.

15. The method as set forth in claim 12, wherein said storage step includes storing a three-row-three-column vector set made up of three, three-imensional vectors and storing a rotation matrix made up of three-row-three-column scalars.

16. The method as set forth in claim 12, wherein said storage step stores color data of a light source with three data values as one data set.

17. The method as set forth in claim 13, wherein said storage step stores the normal line vector data of each apex point of the polygon as a three-row-three-column vector set made up of three three-dimensional vectors.

18. The method as set forth in claim 12, wherein said storage step stores color data of the light sources with three color data values as one data set, and stores the normal line vector data of each apex point of the polygon as a three-row-three-column vector set made up of three, three-dimensional vectors.

19. A method as recited in any of claims 12–18, wherein said image data is video information.

* * * * *

UNITED STATES PATENT AND TRADEMARK OFFICE
CERTIFICATE OF CORRECTION

PATENT NO. : 5,943,057
DATED : Aug. 24, 1999
INVENTOR(S) : Akio Ohba

It is certified that error appears in the above-identified patent and that said Letters Patent is hereby corrected as shown below:

Title page, "Assignee", change "Sony Corporation", to read --Sony Computer Entertainment Inc.--.

UNITED STATES PATENT AND TRADEMARK OFFICE
CERTIFICATE OF CORRECTION

PATENT NO. : 5,943,057
DATED : Aug. 24, 1999
INVENTOR(S) : Akio Ohba

It is certified that error appears in the above-identified patent and that said Letters Patent is hereby corrected as shown below:

Column 3, line 61, change "252, 253" and "251", to read --$25_2$, $25_3$-- and --$25_1$--.

Column 3, Line 62, change "301, 302 and 303", to read --$30_1$, $30_2$ and $30_3$--.

Column 8, lines 15-16, change "LR1, LG1, LB1", to read --$LR_1$, $LG_1$, $LB_1$--.

Column 8, line 17, change "LR2, LG2, LB2", to read --$LR_2$, $LG_2$, $LB_2$--.

Column 8, line 19, change "LR3, LG3, LB3", to read --$LR_3$, $LG_3$, $LB_3$--.

Column 9, line 37, change "(14)", to read --(15)--.

UNITED STATES PATENT AND TRADEMARK OFFICE
CERTIFICATE OF CORRECTION

PATENT NO. : 5,943,057
DATED : Aug. 24, 1999
INVENTOR(S) : Akio Ohba

It is certified that error appears in the above-identified patent and that said Letters Patent is hereby corrected as shown below:

From column 10, line 62 to column 15, line 25, change <u>all</u> bold type, three-and-four character/number call outs so that the last number is subscripted.

Examples:
1. Column 10, line 62, "CM1", should be --CM$_1$--.
2. Column 12, line 31 "MT1", should be --MT$_1$--.
3. Column 12, line 64 "**M112*VY0", should be --M11$_2$*VY$_0$**--.
4. Column 13, line 22, "251", should be --25$_1$--.

Exception:
1. Columns 12 & 13, do not change "TrX".
2. All columns, three character call outs do not change, such as "RBK, GBK, BBK", etc.

Signed and Sealed this

Second Day of May, 2000

Attest:

Attesting Officer

Q. TODD DICKINSON

Director of Patents and Trademarks